United States Patent [19]

Murai

[11] 4,245,483

[45] Jan. 20, 1981

[54] SYSTEM FOR PURIFYING CONTAMINATED REFRIGERANT AND REPRODUCING THE SAME FOR USE WITH FREEZING LIQUID SPRAY REFRIGERATOR

[75] Inventor: Susumu Murai, Kyoto, Japan

[73] Assignee: Kabushiki Kaisha Toyo Seisakusho, Tokyo, Japan

[21] Appl. No.: 38,886

[22] Filed: May 14, 1979

[51] Int. Cl.³ ............................................. F25D 17/02
[52] U.S. Cl. ...................................... 62/376; 62/475; 210/167
[58] Field of Search ...................... 210/167; 62/63, 64, 62/85, 373, 376, 474, 475

[56] References Cited

U.S. PATENT DOCUMENTS

| 2,080,103 | 5/1937 | Zarotschenzeff | 62/64 |
| 3,326,383 | 6/1967 | Pranovi | 210/167 |
| 3,768,272 | 10/1973 | Barrett | 62/85 |

Primary Examiner—Ronald C. Capossela
Attorney, Agent, or Firm—Fred Philpitt

[57] ABSTRACT

A system for use with a freezing liquid (refrigerant) spray refrigerator for foods, in order to purify the refrigerant contaminated with solid filth such as a scale of a fish, dust or the like. Removal of such solid filth from the refrigerant for purification and re-use of the purified refrigerant can be carried out by an arrangement, wherein the refrigerant once sprayed onto the foods for refrigeration and contaminated with solid filth such as a scale of a fish, dust or the like will be conveyed to a filter for separating the solid filth from the refrigerant contaminated with the solid filth; the refrigerant so treated will then be conveyed to a heater in order to heat the refrigerant thereby to flocculate a fat, blood or the like of the foods still remaining in the refrigerant; the refrigerant will further be conveyed to a filter to remove the coagulum; and the refrigerant so purified will finally be conveyed to a reservoir tank for re-use.

7 Claims, 2 Drawing Figures

SYSTEM FOR PURIFYING CONTAMINATED REFRIGERANT AND REPRODUCING THE SAME FOR USE WITH FREEZING LIQUID SPRAY REFRIGERATOR

BACKGROUND OF THE INVENTION

This invention relates to a system for purifying contaminated refrigerant and reproducing the same for use with freezing-liquid-spray refrigerator.

In freezing the foods, such as a fish or meat, there is known a method in which the freezing liquid (refrigerant) is arranged to be directly sprayed onto the foods. The most serious disadvantage in this conventional freezing method will be that the freezing liquid once sprayed onto the foods and collected can hardly be re-used for refrigeration, this being due to the facts that the freezing liquid will be contaminated with a scale, oils and fats, albumen or blood in case the foods to be refrigerated are fishes whilst the freezing liquid will be contaminated with a piece of meat, oils and fats, albumen or blood in case the foods to be refrigerated are various kinds of a meat. Such disadvantage will apparently necessitate a large quantity of freezing liquid to be used and involve a very high cost for refrigeration of foods.

BRIEF SUMMARY OF THE INVENTION

A first and general object of the present invention is to provide a system for reproducing the freezing liquid without such disadvantage as referred to above in connection with Background Of The Invention.

More specifically, a first object of the present invention is to provide a system wherein arrangement is made that the freezing liquid once sprayed onto the goods for refrigeration and contaminated with the solid filth is conveyed to a filter to remove the solid filth from the freezing liquid.

A second object of the present invention is to provide a system wherein an arrangement is made that the freezing liquid with the said solid filth having been removed by means of the said filter is further conveyed to a heater so that the albumen, fatty substance, blood or the like still remaining in the liquid may be solidified through the heater and the solidified substance may be removed thereafter by means of a filter disposed next to the heater.

A third object of the present invention is to provide a system wherein an arrangement is made that the freezing liquid with the said solidified substance having been removed by means of the said heater is conveyed to an adsorber consisting of an activated carbon or the like in order to effect deodorization and decoloration of the freezing liquid.

A fourth object of the present invention is to provide a system wherein an arrangement is made that the freezing liquid settling in the bottom of the filter referred to above is fed to an auxiliary filter provided with a screen so that the solid filth may completely be removed and the liquid so treated be preserved in a tank for re-use of the freezing liquid.

A fifth object of the present invention is to provide a system wherein an arrangement is made that propylene-glycol which is harmless and is of the low boiling point is employed as the freezing liquid.

BRIEF DESCRIPTION OF THE DRAWINGS

How the foregoing objects and advantages are attained will appear more fully from the following description referring to the accompanying drawings, in which.

DETAILED DESCRIPTION OF THE INVENTION

Figure 1:
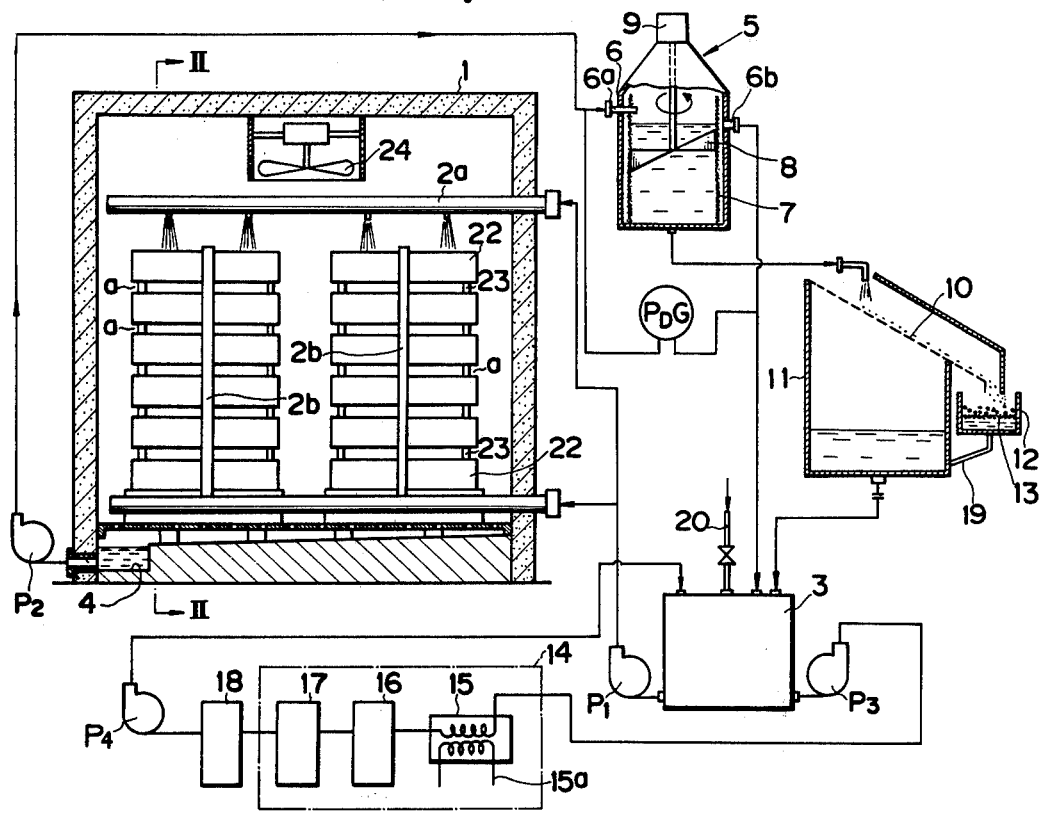
FIG. 1 is a flow diagram to show one embodiment of a system according to the present invention.
Figure 2:
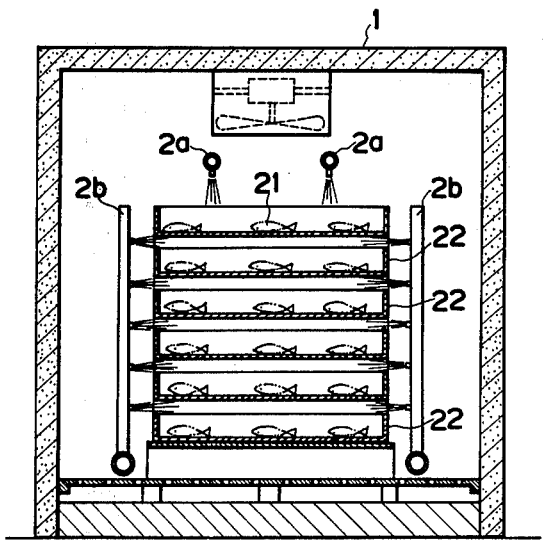
FIG. 2 is a section taken along the lines II—II of FIG. 1.

Referring now to the drawings, designated generally by reference numeral 1 is a freezing chamber. A plurality of cases 22 are disposed in the freezing chamber, piled up one upon the other with intervals a between each case provided by spacers 23, each case containing foods to be frozen 21 such as fish, meat or the like. Each case 22 is provided with an opening at its top and a number of holes at its bottom. Disposed also in the freezing chamber 1 and designated by reference numerals 2a, 2b are upper spraying nozzles and side spraying nozzles respectively, both of these nozzles being to directly scatter the freezing liquid onto the foods to be frozen to effect quick-freezing of the foods. The foods contained in the uppermost case 22 will be caused to be frozen by the freezing liquid to be scattered through the upper spraying nozzles 2a whilst the foods contained in other cases 22 than the uppermost cases will be frozen by the freezing liquid to be scattered through the side spraying nozzles 2b past through the intervals a provided between each case by means of the spacers 23. Disposed still further in the upper portion of the freezing chamber 1 and designated by reference numeral 24 is a fan to diffuse the freezing liquid coming into the chamber through the spraying nozzles 2a, 2b such that the freezing liquid may uniformly be distributed onto all of the foods to be frozen. It has been found to be preferable to employ a harmless refrigerant as the freezing liquid, such as propylene-glycol, cooled to the temperature of from $-10°$ C. $\sim -25°$ C. before being sprayed to the foods to be frozen.

Formed in the bottom of the freezing chamber 1 and designated by reference numeral 4 is a pit into which the freezing liquid contaminated with solid material such as a scale of a fish, dust or the like is to flow. The freezing liquid so contaminated will then be conveyed to a continuous filter 5 by means of a pump P2. The filter 5 consists of a housing 6, a cylindrical filter tube 7, a scraper 8 and a motor 9 to drive the scraper 8. The filter 7 is made of a cylindrical member provided with a number of small holes therearound. The scraper 8 is installed within the filter tube 7 so as to be rotatable touching the inner surface of the filter tube 7.

Designated by reference numeral 6a is an inlet port through which the freezing liquid contaminated is to be conveyed into the material tube 7. Solid filth such as a scale of a fish, dust or the like contained in the freezing liquid will be removed while passing through a number of small holes of the filter tube 7 and the freezing liquid so treated will further be conveyed, via an overflow pipe 6b, into a tank designated by reference numeral 3 which is designed to work also as a cooler.

The freezing liquid still contaminated with solid material and remaining in the bottom of the filter tube 7 will flow out from bottom toward an inclined screen 10 designed to be vibrated to separate the solid material from the freezing liquid so that only the freezing liquid will flow into a filter tank 11 whilst the solid filth will move down on the inclined screen into a tank 12. A screen 13 is disposed in the tank 12 with an appropriate space from the bottom of the tank 12. A relatively small quantity of the freezing liquid purified by the screen 13 will be recovered via a return pipe 19 into the filter tank 11. The freezing liquid so recovered will be conveyed into the tank 3.

The freezing liquid in the tank 3 will be conveyed into a further purifying means, where the freezing liquid will be heated by a coagulation means 15 provided with a heater 15a, such that flocculent coagulation of a protein or a fat of the fish contained in the freezing liquid may occur. Such coagulated protein or fat of the fish will then be caused to be separated from the liquid through a filter 16, whereafter the freezing liquid will be decolored and deodorized by means of an adsorber 17 consisting of an active carbon or the like.

The freezing liquid so treated will then be conveyed into a reservoir tank 18 and will further be conveyed back into the tank 3 by means of a pump 4 so as to be mixed with the freezing liquid overflowing from the filter 5. Such mixed and purified freezing liquid will again be fed, by means of a pump P1, to the spraying nozzles disposed within the freezing chamber 1. It is to be noted that fresh freezing liquid may additionally be fed into the tank 3 via a feed pipe 20, according to necessity.

It will be appreciated from the foregoing description that the freezing liquid contaminated with, for instance, the scale of a fish can be separated by means of the filter 5 into the purified freezing liquid and the scale of a fish. The purified freezing liquid will then flow into the tank 3 whilst the freezing liquid still contaminated with the scale of a fish will be conveyed toward the screen 10. Since this screen 10 represents an inclined plane and is arranged to be vibrated, the freezing liquid still contaminated with the scale of a fish will be separated into the purified freezing liquid and the scale, the purified freezing liquid being to drop through the screen 10 into the filter tank 11 and the scale being to move down on the inclined screen into the tank 12, whereby the scale not having been removed by the continuous filter 5 will completely be removed to purify the freezing liquid. The purified freezing liquid stored in the filter tank 11 will flow into the tank which is designed to work also as a cooler, whereafter the liquid will further be conveyed to the purifying device arranged to be in a position next to the tank such that a protein, fat, or evil-smelling compound still remaining in the freezing liquid may be removed and decolored. The freezing liquid so reproduced will again be conveyed to the spraying nozzles installed within the freezing chamber.

It will thus fully be appreciated from the foregoing description that the removal of the scale or the like contained in the refrigerant and the re-use of the purified refrigerant, which has heretofore been very difficult, can easily be carried out by the use of the system according to the present invention.

While there has been described a preferred form of the invention, obviously modifications and variations are possible in light of the above teachings. It is therefore to be understood that within the scope of the appended claims, the invention may be practiced otherwise than as specifically described.

What is claimed is:

1. A system for purifying contaminated refrigerant and reproducing the same for use with a freezing liquid spray refrigerator, comprising:
   (a) a pool designed to recover the freezing liquid scattered through spraying nozzles onto the foods to be frozen within a freezing chamber;
   (b) a filter having an outer cylinder and an inner cylinder with a number of small filtering holes therearound, said outer cylinder being provided with an overflow pipe and said inner cylinder being provided with an inlet port such that the freezing liquid may be fed from said pool into the inner cylinder;
   (c) a tank designed to store the freezing liquid overflowing from said overflow pipe of said filter and to cool such freezing liquid;
   (d) means to convey the freezing liquid in store in said tank into said spraying nozzles within said freezing chamber by means of a pump; and
   (e) a purifier comprising a heating means to coagulate thermosetting substance contained in the freezing liquid flowing out from said tank; a filtering means to separate the coagulated substance from the freezing liquid; a deodorizing means to deodorize evil-smelling of the freezing liquid filtered by said filtering means; a feeder means designed to convey the deodorized freezing liquid back into said tank.

2. A system for purifying contaminated refrigerant and reproducing the same for use with a freezing liquid spray refrigerator as claimed in claim 1, wherein a layer consisting of an active carbon is employed in the deodorizing means to deodorize evil-smelling of the freezing liquid.

3. A system for purifying contaminated refrigerant and reproducing the same for use with a freezing liquid spray refrigerator, comprising:
   (a) a pool designed to recover the freezing liquid scattered through spraying nozzles onto the foods to be frozen within a freezing chamber;
   (b) a filter having an outer cylinder and an inner cylinder with a number of small filtering holes therearound, said outer cylinder being provided with an overflow pipe and said inner cylinder being provided with an inlet port such that the freezing liquid may be fed from said pool into the inner cylinder;
   (c) a tank designed to store the freezing liquid overflowing from said overflow pipe of said filter and to cool such freezing liquid;
   (d) means to convey the freezing liquid in store in said tank into said spraying nozzles within said freezing chamber by means of a pump;
   (e) a purifier comprising a heating means to coagulate thermosetting substance contained in the freezing liquid flowing out from said tank; a filtering means to separate the coagulated substance from the freezing liquid; a deodorizing means to deodorize evil-smelling of the freezing liquid filtered by said filtering means; and a feeder means designed to convey the deodorized freezing liquid back into said tank;
   (f) an auxiliary filtering means having an auxiliary filtering tank and an inclined screen disposed above the auxiliary filtering tank, the bottom of such filtering tank being connected to said tank to store the freezing liquid, an outlet pipe connected to the bottom of said inner cylinder of said filter being disposed in a manner that the forward end of such outlet pipe faces on the upper direction of the inclined screen.

4. A system for purifying contaminated refrigerant and reproducing the same for use with a freezing liquid spray refrigerator as claimed in claim 3, wherein an arrangement is made that the inclined screen of the auxiliary filtering means vibrates.

5. A system for purifying contaminated refrigerant and reproducing the same for use with a freezing liquid spray refrigerator as claimed in claim 3, wherein a screen is also provided within the auxiliary filtering tank.

6. A system for purifying contaminated refrigerant and reproducing the same for use with a freezing liquid spray refrigerator as claimed in claim 3, wherein a scraper is installed within the inner cylinder of the filter in such a manner that the outer end of such scraper rotates touching the inner surface of the inner cylinder.

7. A system for purifying contaminated refrigerant and reproducing the same for use with a freezing liquid spray refrigerator as claimed in claims 1 or 3 wherein propylene-glycol liquid is used as the freezing liquid.

* * * * *